United States Patent [19]
Currie et al.

[11] Patent Number: 4,821,425
[45] Date of Patent: Apr. 18, 1989

[54] CYLINDRICAL SURFACE PROFILE AND DIAMETER MEASURING TOOL AND METHOD

[75] Inventors: James R. Currie; Ralph R. Kissel; Charles E. Oliver; Earnest C. Smith; John W. Redmon; Charles C. Wallace; Charles P. Swanson, all of Huntsville, Ala.

[73] Assignee: United States of America as represented by the Administrator, National Aeronautics and Space Administration, Washington, D.C.

[21] Appl. No.: 122,740

[22] Filed: Nov. 18, 1987

[51] Int. Cl.⁴ .............................................. G01B 7/28
[52] U.S. Cl. .................................... 33/520; 33/178 E; 33/551; 33/504
[58] Field of Search ............. 33/178 E, 178 R, 178 D, 33/543, 550, 551, 553, 554, 504, 520

[56] References Cited

U.S. PATENT DOCUMENTS

| | | | |
|---|---|---|---|
| 3,259,989 | 7/1966 | Wilson | 33/520 |
| 3,866,829 | 2/1975 | Egawa et al. | 33/550 |
| 3,942,253 | 3/1976 | Gebel et al. | 33/178 D |
| 4,521,968 | 6/1985 | Wiltermood et al. | 33/178 E |
| 4,653,196 | 3/1987 | Moschner et al. | 33/178 E |

Primary Examiner—William D. Martin, Jr.
Attorney, Agent, or Firm—William J. Sheehan; John R. Manning; Charles E. B. Glenn

[57] ABSTRACT

A tool is shown having a cross beam assembly (15) made of beams (18, 19, 20, 21) joined by a center box structure (23). The assembly (15) is adapted to be mounted by brackets (16) to the outer end of a cylindrical case (11). The center box structure (23) has a vertical shaft (25) rotatably mounted therein and extending beneath the assembly (15). Secured to the vertical shaft (25) is a radius arm (28) which is adapted to rotate with shaft (25). On the longer end of the radius arm (28) is a measuring tip (30) which contacts the cylindrical surface to be measured and which provides an electric signal representing the radius of the cylindrical surface from the center of rotation of the radius arm (28). An electric servomotor (49) rotates the vertical shaft (25) and an electronic resolver (61) provides an electric signal representing the angle of rotation of the shaft (25). The electric signals are provided to a computer station (73) which has software for its computer to calculate and print out the continuous circumference profile of the cylindrical surface, and give its true diameter and the deviations from the ideal circle.

13 Claims, 5 Drawing Sheets

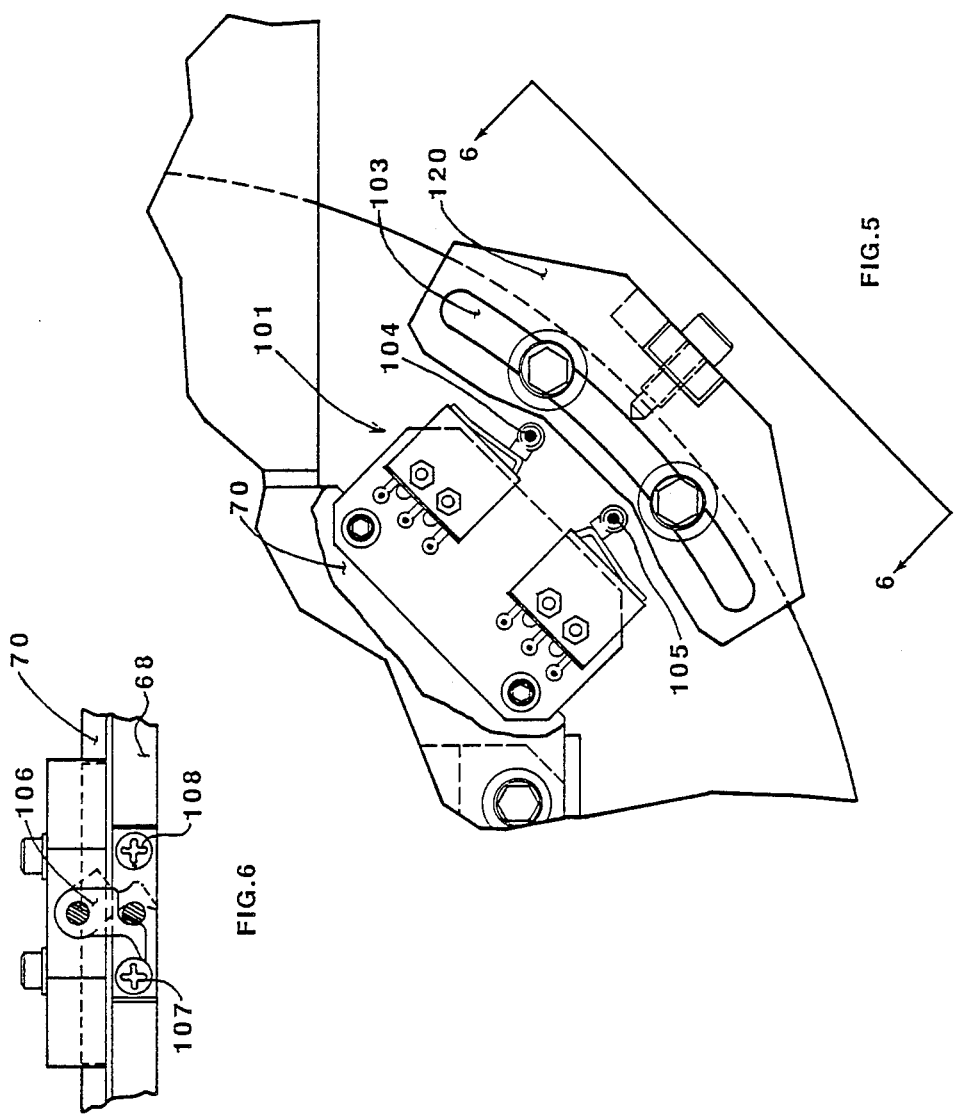

CYLINDRICAL SURFACE PROFILE AND DIAMETER MEASURING TOOL AND METHOD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

TECHNICAL FIELD

This invention relates to a tool and method for measuring and recording the profile and diameter of a cylindrical surface at great accuracy, and more particularly to a tool and method for measuring the profile and diameter of surfaces of large cylindrical objects such as solid rocket motor cases in which the axis center is not precisely known.

BACKGROUND ART

Measurement of large diameter cylindrical cases has herebefore been accomplished by essentially manual techniques which while adequate for construction type activities do not meet the needs for assembling together large segmented cylindrical cases of solid rocket motors. A need exists for continuous profile information of the cylindrical surfaces of adjacent segments that were to be joined together. The out-of-roundness of a rocket motor case segment is not necessarily objectionable if the adjacent case segments that were to be joined were similarly out-of-round. Manually performing measurements to support such a profile for a rocket motor case segment would literally run into thousands of measurements and have a significant possibility of human error. While apparatus for simply measuring the diameter of an internal cylindrical surface has been accomplished, as shown by U.S. Pat. No. 4,521,968, with a radius arm with a linear transducer, such apparatus depends on having the rotating radius arm at the precise axis center of the cylinder that is defined by the cylindrical surface.

STATEMENT OF THE INVENTION

The present invention provides a device or tool having a cross beam assembly that fits onto the cylindrical case and includes a movable radius measuring arm that rotates and detects continuously the profile of the cylindrical surface relative to the rotation center of the arm. The radius arm is driven by a servomotor gear train and has a resolver that provides electrical signals of the relative position of the arm. The distal end of the radius arm from its rotational center has a digital linear gauge which is biased by a constant pressure to contact the cylindrical surface to be profiled and thus follow it as the radius arm rotates, all the time providing an electrical signal of the relative location of the cylindrical surface. The electrical signals from the resolver and linear gauge are provided to a computer system by which an offset circle based on the true diameter of the cylindrical case surface measured is plotted together with case profile deviations therefrom.

Accordingly, it is an object of the present invention to provide an automated cylindrical profile and diameter measuring tool and method that works easily and with great accuracy.

Another object is to provide a cylindrical profile and diameter measuring tool that may be positioned on cylindrical cases easily without regard to the radius center of the cylindrical case and is essentially portable so it may be placed on cylindrical cases regardless of their relative orientation.

Yet another object is to provide a cylindrical profile and diameter measuring tool which is not dependent on knowing the exact physical location of the radius center of that cylindrical surface.

BRIEF DESCRIPTION OF THE DRAWINGS

FIG. 5 is a partial top view of the upper center housing plate covering the lower center plate of FIG. 4 and fixed to the cross beam structure and showing the stop and switch actuator.

FIG. 6 is a view along line 6—6 of FIG. 5 showing the mechanical stop.

DETAILED DESCRIPTION OF THE INVENTION

Figure 1:
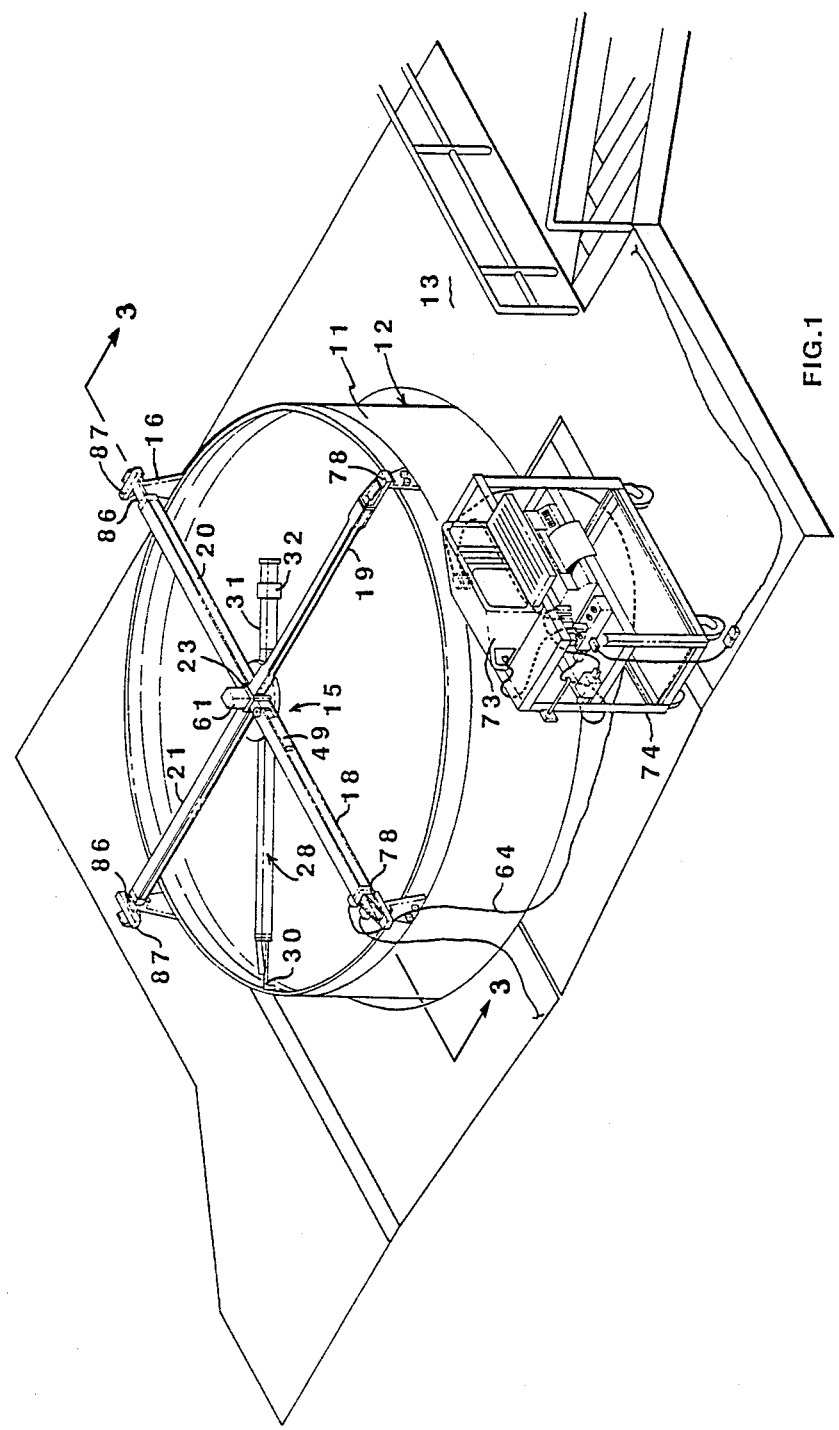
FIG. 1 is a pictorial view of the cylindrical surface and diameter measuring tool of the present invention.

Referring to the drawings, FIG. 1 shows a large cylindrical case 11 resting on a floor (not shown) and extending through a hole 12 in a work platform 13. The platform 13 is at a level to provide access by workmen to the open end of the cylindrical case 11. Mounted across the open end of the case 11 is a cross beam structure 15 of the present invention that has brackets 16 secured by bolts or the like to the outer surface of the cylindrical case 11. In the drawings the cross beam structure 15 is mounted by end brackets 16 to the clevis end of a solid rocket rocket case segment 11, as shown best in FIGS. 2 and 3.

Figure 2:
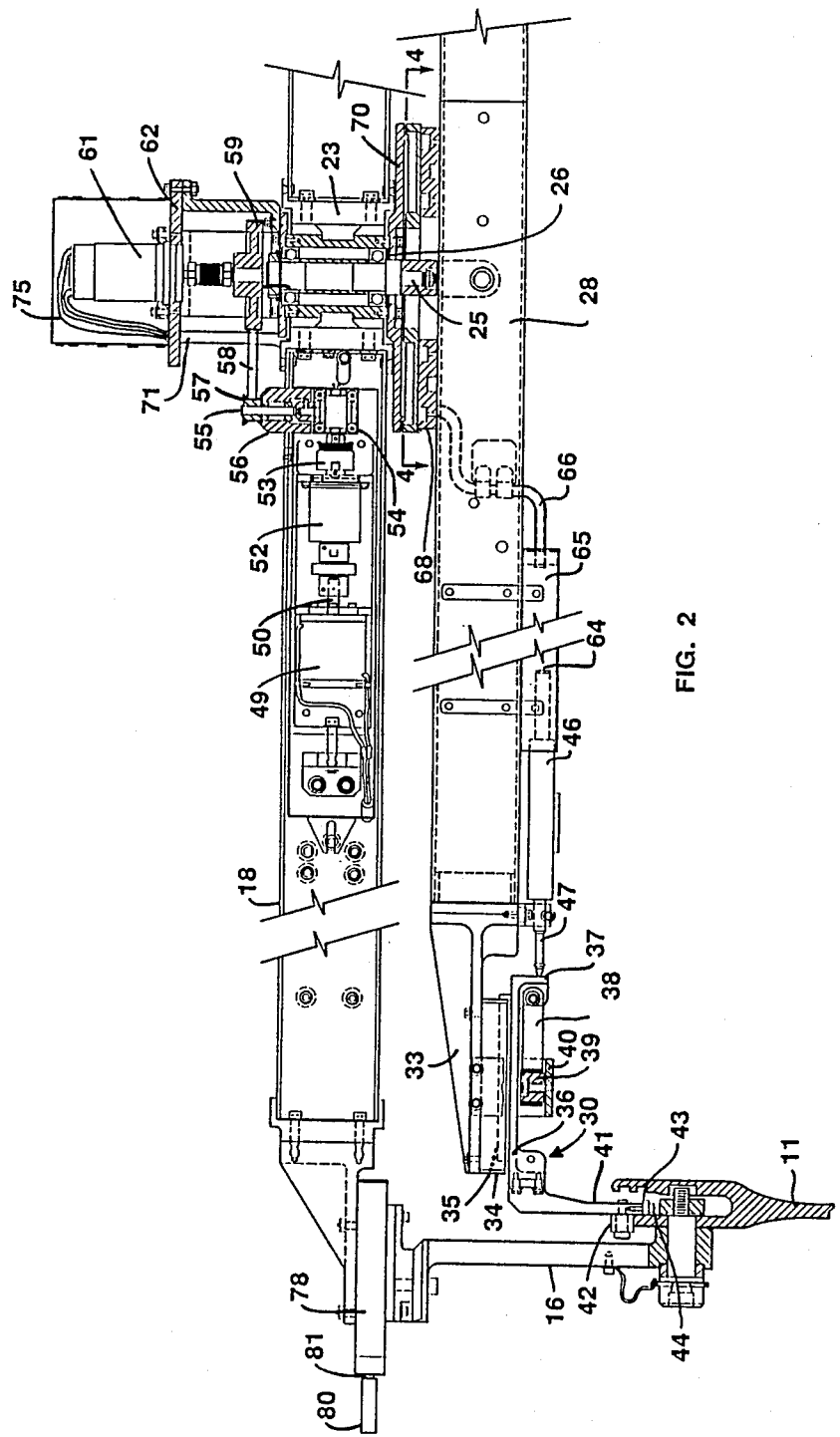
FIG. 2 is an enlarged side view showing the movable radius arm assembly association with the main cross beam structure, some parts shown in section.
Figure 3:
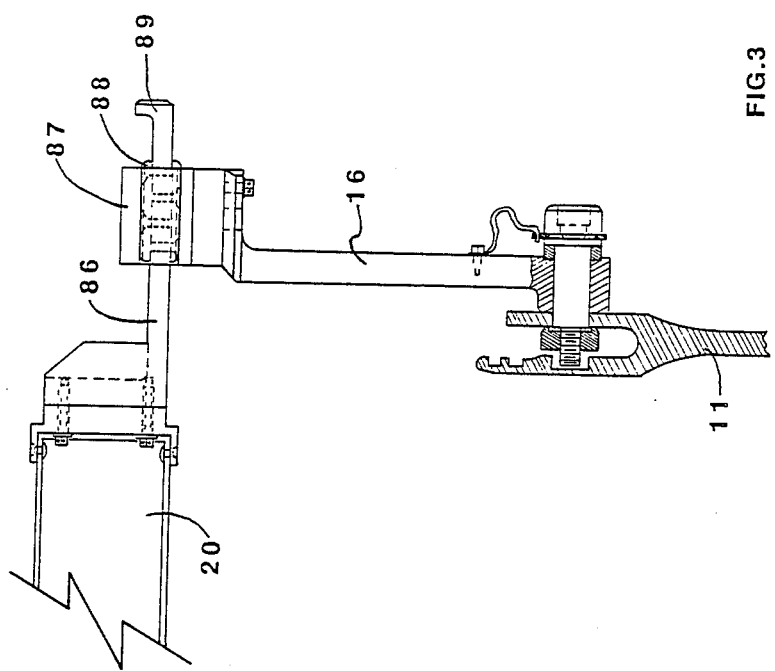
FIG. 3 is a partial view showing the slidable end structure of a the main cross beam structure then along line 3—3 of FIG. 1.

The cross beam structure 15 is made of H-beams 18, 19, 20, 21 joined together by a center box structure 23 which, as shown best in FIG. 2, has therein a vertical shaft 25 rotatably mounted by bearing races 26. The lower part of the vertical shaft 25 is joined to a radius arm 28 which is adapted to rotate with the shaft 25 and is beneath the cross beam structure 15 for this particular embodiment. The radius arm 28 is a box structure with a end measurement tip 30 secured to its end that is specially designed for contacting the cylindrical surface to be measured with a constant force. The opposite radius arm end 31 extends only a short distance from the rotating shaft center but has a slidable ring weight 32 thereon so as to counterbalance the weight of the longer measuring radius arm end. As shown in FIG. 2, the end measurement tip 30 is oriented to contact the outer inside surface of the clevis of the solid rocket motor case segment.

The measurement tip 30 is an assembly consisting of a supporting bracket 33 attached to the longer end of the radius arm 28 which supports in turn a fixed member 34 having a ball race slide 35. Attached to the bottom of the slide 35 is a channel member 36 that is connected by its inside flange 37 with a negator spring 38 that extends from and is wound onto a drum 39 secured to an hanger member 40 extending down from supporting bracket 33. Thus as shown the negator spring 38 urges with a constant force the channel member 36 which in this example has a lower extending support 41 having a support roller 42 riding on the upper edge surface of the clevis and a measurement wheel 43 rolling on the cylindrical surface 44 to be measured. Thus, it can be seen that the measurement wheel 43 is exerted against the cylindrical surface 44 with a constant force by the action of the negator spring 38 pulling on the channel member 36 which moves with little friction because of the ball race supported slide 35.

An essential element of the measurement tip 30 is the device to measure the movements of the channel member 36 and this is accomplished by an electronic linear gage 46 of a standard commercial type which has a biased plunger shaft 47 which rides against the end flange 37 surface of the channel member 36 and follows its movement back and forth. The linear gage 46 provides a digital electrical signal with respect to the position of the biased plunger shaft 47 and therefore its signal can correlate to the change in the cylindrical surface 44 being measured with respect to the rotation center of the radius arm 28.

As also noted in FIG. 2 an electric servomotor 49 is mounted within the flanges of crossbeam 15 which drives a shaft 50 which drives a gear train (1,000 to 1 ratio) 52 which in turn drives through a slip clutch 53 and another gearing box 54 a vertical shaft 55 within an housing 56. The housing 56 extends through a cut-out of the upper flange in the crossbeam. The gearing box 54 transmits the horizontal rotation of the shaft from the slip clutch 53 into a 90 degree change gearing box 54. A pulley 57 is fixed to the upper end of the vertical shaft 55, which pulley 57 drives a belt 58 which rotates a larger pulley 59 fixed to the vertical shaft 25 extending from the center box structure 23 tying the crossbeams together. An electronic resolver 61 of a standard commercial type is mounted to a platform housing 62 extending above the larger pulley 59 for providing an electric signal of the sine and cosine relationship of the rotation angle of its shaft, which shaft is secured to the vertical shaft 25 that drives the radius arm 28 in its rotation. The drive mechanism described gives a measuring speed at the end of the radius arm 28 of approximate five inches per circumference per second.

Figure 4:
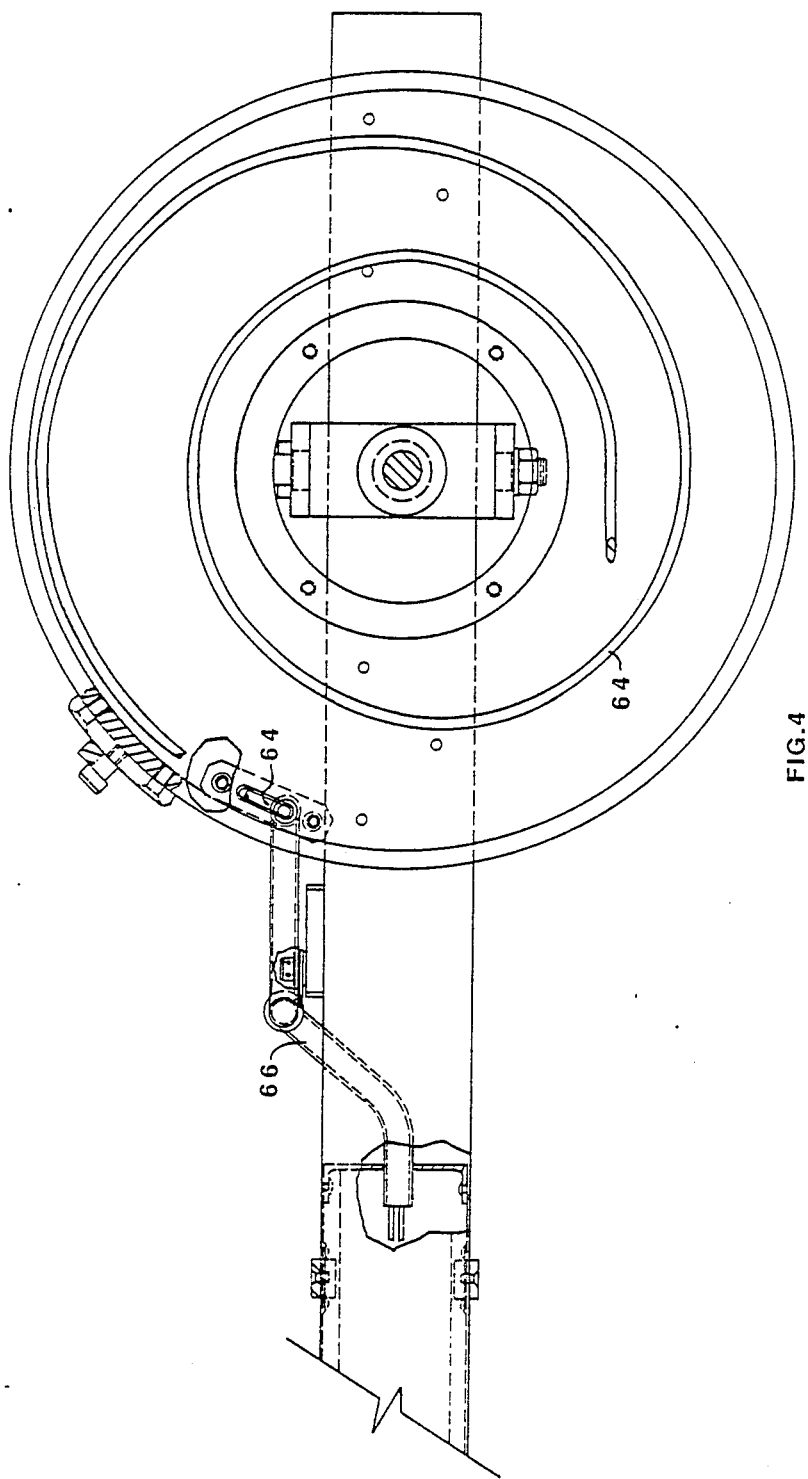
FIG. 4 is a top view of the lower center housing tray plate fixed to the radius arm and rotating shaft and showing the coiling of the electrical wire to permit the rotation of the arm, taken along line 4—4 of FIG. 2.

The signal and power wires 64 for the linear gauge 46 are fastened to the radius arm 28, as indicated in FIG. 2, and are snaked through a protective tunnel 65 and tube 66 into the lower circular center tray plate 68 fastened to the radius arm 28 and having its center corresponding to the axis of the housing vertical shaft 25. As shown best in FIG. 4, the signal and power wire 64 is coiled within the upper surface of the tray plate 68 so as to permit a limited rotation of the radius arm 28 relative to the fixed crossbeam structure 15. The signal and power wire 64 exits from the upper center housing plate 70 and extends within a tube 71 as indicated in FIG. 2 along the crossbeam 18 holding the servomotor 49 to the computer and printer station 73 which is shown on a portable cart 74. Other signal wires from the resolver 61 also exit along the same crossbeam 18 in the same bundle of power and signal wires 64 to the computer and printer station 73. The same crossbeam 18 carries the power line for the electric servomotor 49, linear gauge 46, and electronic shaft angle resolver 61.

Referring to FIG. 1 again, it should be noted that one end of each of the two extended and perpendicular crossbeams 18, 20 and 19, 21 is fixed to an adjustable micrometer 78 of a standard design, shown best in FIG. 2, which is able to shift that particular crossbeam a short distance toward or away from its bracket support 16 by the operator rotating a knob 80 on the operating shaft 81. The other ends of the same respective extended crossbeam 18, 20 and 19, 21 are slidably held to their brackets 16, shown best in FIG. 3, by having a flat bar extension 86 which slides to and fro within a tunnel receptacle 87 having Teflon, plates 88 to reduce the friction. The flat bar extension 86 has an end lip 89 to serve as a stop so it may not be pulled through the receptacle 87. The adjustable support 86 permits the center housing 23 of the crossbeam structure 15 relative to the cylindrical casing being measured to be shifted a short distance. Also, in this regard, as noted in FIG. 1 one half 19 of an extended crossbeam 19, 21 has its flange width reduced which enables that crossbeam 19 to flex slightly to relieve any strain caused by slight misalignments that the brackets 16 may introduced.

In operation the radius arm 28 only makes one 360 degree rotation to provide the needed measurements for the profile and diameter determinations. The power switch in that regard is turned on and off by the computer of the computer and printer station 73 As shown in FIG. 5 a cam operated electrical switch 101 is mounted on the center housing cover plate 70 and the cam 102 is mounted on the edge of the center tray plate 68 which rotates with the radius arm 18 about the housing shaft 25. The cam member 102 has a slot 103 to enable it to be adjusted relative to the switch activator arms 104, 105. One switch arm 104 is activated during the counter-clockwise rotation and the other switch arm 105 is activated on the return or clockwise rotation A mechanical stop as shown in FIG. 6 is also provided to prevent the overrun of the radius arm except for a few degrees from one complete turn. It has a pivoting dog leg 106 that has an interfering fit with a extending member 107 in one direction to stop rotation but permits the center tray plate 68 to rotate in the opposite direction because the leg end is too short to interfere with the other extending member 108.

The computer of the computer and printer station 73 receives the signals from linear gauge 46 which by adding the known distance of the radius arm 28 length gives the radius length of the cylindrical surface 44 being measured. The location of the radius arm 28 relative to the cylindrical surface is determined by the electrical resolver 61 signal, which gives the angle rotation of the radius arm, to the computer. Thus, it can be seen that the profile of the cylindrical surface of the cylindrical surface can be determined based on the radius arm center and readily be printed in chart form from basic calculations. However, the data also provides the basis of determining the true center of the cylindrical surface by offset circle calculations using the least square curve fit. In practice, the computer software is such as to provide in chart form the continuous circumference profile and radius of the cylindrical surface, its diameter, its maximum plus deviation and its maximum negative deviation from an ideal circle based on the calculated radius. Thus, it can be seen that the profile and diameter measuring tool described need not be located at the exact center of the cylindrical circle to obtain the profile information needed which is a great aid in the setting up of the tool for measurement.

It is now apparent that a tool and method has been described that can measure the diameter of a large cylinder with great accuracy. In the use of the tool and method for measuring solid rocket case segments it is now practical to match those segments which are substantially of the same roundness and profile. The roundness data can be used to determine shim thickness and interference fit between adjacent segments. Also, the segment case can be squeezed while the tool is set up thereon to more closely achieve a certain roundness and the results may be quickly checked by operation of the tool. Further the measurement tip of the radius arm may be of different shapes and configurations to best fit against the cylindrical surface. The tool can as readily measure the cylindrical surface of a case segment hanging from a hoist as it can when the case segment is sitting on a surface.

While the invention has been described relative to a specific embodiment, it is evident that modifications and changes may be made with regard thereto without departing from the scope of the claims.

What is claimed is:

1. A cylindrical surface profile measuring tool comprising:
   a radius arm adapted to rotate about an offset center from the true radius center of an cylindrical surface,
   means to rotate said radius arm about said offset center, said means including a two crossing beams structure adapted to be fixed to the open end of said cylindrical surface,
   said radius arm having means to detect a surface of the cylindrical surface to be measured and a means to provide a first electrical signal indicative of said surface radius from the center of rotation of the radius arm,
   resolving means for determining the angle of rotation of said radius arm at any interval and providing a second electrical signal indicative of its angle position,
   computer means for receiving said first and second electrical signals and computing therefrom the continuous circumference profile of said surface of said cylindrical surface and the true radius center of said surface.

2. A measuring tool according to claim 1, further comprising:
   said means to detect said surface of the cylindrical surface including a detachable member on the end of said radius arm,
   said detachable member having a wheel for contacting said surface of the cylindrical surface,
   said radius arm having an urging means to force said wheel against said surface of the cylindrical surface and to enable said detachable member to move so as to follow irregularities of said surface,
   said means for providing a first electrical signal is a digital gauge with biased plunger shaft that rides against said urging means urging said detachable member.

3. A measuring tool according to claim 2, further comprising:
   said two crossing beams structure having at its center a shaft rotatably mounted thereon, said shaft supporting said radius arm for rotating movement,
   motor means for rotating said shaft,
   said resolving means secured to said shaft and thereby providing an indication of the angle of rotation of said shaft which corresponds to the angle of rotation of said radius arm.

4. A measuring tool according to claim 3, further comprising:
   said motor means is mounted on one of said two crossing beams structure and drives said shaft with a belt means.

5. A measuring tool according to claim 4, further comprising:
   said radius arm having a long portion extending from the center it is adapted to rotate about, said long portion having at its end said means for detecting a surface of the cylindrical surface, and said radius arm having a short portion extending from the center it is adapted to rotate,
   a slidable weight mounted on said short portion of said radius arm to counterbalance the longer portion of said radius arm with its means for detecting a surface of the cylindrical surface.

6. A measurement tool according to claim 5, further comprising:
   said two crossing beams structure has its crossing beams perpendicular to each other,
   one end of each crossing beam having an adjustable means for moving the cross beam toward or away relative to the edge circumference of the open end of a cylindrical tube segment, and the other end of each crossing beam having a slidable means permitting that end to move in response to changes made to the adjustment means relative to the edge circumference of the open end of a cylindrical tube segment.

7. A measurement tool according to claim 6, further comprising:
   bracket means on each end of said two crossing beams for supporting said two crossing beam structure to the open end of a cylindrical tube segment.

8. A measurement tool according to claim 7, further comprising:
   each of said crossing beams being an H-beam, and one half of one of said crossing beams having the width of its flanges reduced so as to enable said beam and thus said two crossing beam structure to relieve any strain caused by slight misalignments of said bracket means.

9. A cylindrical surface and diameter measuring tool comprising:
   a cross beam assembly that fits onto the open end of a cylindrical case,
   said cross beam assembly including a center structure having elongated beams extending therefrom,
   bracket means for securing said elongated beams to the open end of a cylindrical case,
   said center structure having a rotatably mounted shaft, an end portion of said shaft extends from said center structure,
   a radius arm beam secured to said end portion of said shaft and adapted to rotate with said shaft,
   resolver means for providing a first electric signal representative of the rotation angle of said shaft,
   said radius arm beam having means thereon for detecting the location of the cylindrical surface to be measured and providing a second electric signal representative of the radius of said cylindrical surface from the center of rotation of said shaft and radius arm beam.

10. A tool according to claim 9, further comprising:
    computer means for receiving said first and second electric signals and computing the circumference profile of said cylindrical surface including its true diameter by offset circle calculations.

11. A tool according to claim 9, further comprising: said radius arm means for detecting the location of the cylindrical surface to be measured includes a slidable member having a wheel that contacts said cylindrical surface, and means to permit said slidable member to shift in response to the surface irregularities of said cylindrical surface while maintaining said wheel in contact with said cylindrical surface.

12. A tool according to claim 9, further comprising: means for urging said slidable member with a constant force so as to force said wheel against said cylindrical surface.

13. A tool according to claim 12, further comprising:
a motor means for rotating said shaft for driving said radius arm beam along the circumference of said cylindrical surface,
a stop means on said center structure for preventing said radius arm structure from making more than a single 360 degree rotation,
said stop means including switches which turn off the power to said motor means.

* * * * *